United States Patent [19]

Brown et al.

[11] Patent Number: 4,926,370

[45] Date of Patent: May 15, 1990

[54] METHOD AND APPARATUS FOR PROCESSING POSTNORMALIZATION AND ROUNDING IN PARALLEL

[75] Inventors: Jeffrey D. Brown; Donald L. Freerksen; Scott A. Hilker; Daniel L. Stasiak, all of Rochester, Minn.

[73] Assignee: International Business Machines Corporation, Armonk, N.Y.

[21] Appl. No.: 339,348

[22] Filed: Apr. 17, 1989

[51] Int. Cl.$^5$ ................................................ G06F 7/38
[52] U.S. Cl. ........................................ 364/748; 364/745
[58] Field of Search ................................ 364/748, 745

[56] References Cited

U.S. PATENT DOCUMENTS

| 4,528,640 | 7/1985 | Criswell | 364/748 |
| 4,562,553 | 12/1985 | Mattedi et al. | 364/745 |
| 4,758,972 | 7/1988 | Frazier | 364/745 |
| 4,779,220 | 10/1988 | Nukiyama | 364/748 |
| 4,796,217 | 1/1989 | Takahashi et al. | 364/745 |

OTHER PUBLICATIONS

Finney et al., "Rounding IEEE Floating Point Results", IBM Technical Disclosure Bulletin, vol. 27, No. 5, Oct. 1984, pp. 3138-3140.

*Primary Examiner*—Gary V. Harkcom
*Assistant Examiner*—Tan V. Mai
*Attorney, Agent, or Firm*—Paul L. Sjoquist

[57] ABSTRACT

A method and apparatus for processing postnormalization and rounding in parallel in floating point arithmetic circuits. The fractional result of a floating point arithmetic operation is simultaneously passed to a normalized circuit and a round circuit, and the first two bit positions of the fractional result are examined. If the 2-bit format is 1.X the round circuit is activated; if the 2-bit format is 0.1X the fractional result is shifted left one position and the round circuit is activated; if the 2-bit format is in neither of the above formats the normalize circuit is activated. In no event is it necessary to activate sequentially the normalize circuit and the round circuit.

5 Claims, 3 Drawing Sheets

METHOD AND APPARATUS FOR PROCESSING POSTNORMALIZATION AND ROUNDING IN PARALLEL

BACKGROUND OF THE INVENTION

The present invention relates to a method and apparatus for performing floating point arithmetic operations in a data processing system. More particularly, the invention relates to an apparatus, and method for implementing the apparatus, for performing floating point operations by parallel processing the steps of normalizing and rounding to complete the floating point operation. These steps are performed after the floating point arithmetic operation has been completed, and a floating point answer has been developed.

The use of floating point arithmetic operations in a data processing system has been a common practice practically since the inception of computer technology. The development of floating point arithmetic hardware has taken many forms, usually with the objectives of simplifying the hardware construction, or enhancing the speed of the arithmetic processing operation. The four arithmetic operations of add, subtract, multiply and divide have usually been accomplished by using specialized subsets of processes involving addition and subtraction. For example, multiplication operations have in many cases been performed by repeated addition processes, and division has been accomplished by a process of repeated subtraction. The efforts made to speed up these processing operations have focused on enhancements and simplifications of hardware circuit design, particularly the adder circuit, which ultimately limits the maximum processing speed of all arithmetic operations. In the case of division, efforts have been made to increase the speed of operation by calculating partial quotients, or by simultaneously predicting multiple quotient bits, to reduce the number of addition or subtraction iterations required for the divide calculation.

An American national standard has been developed in order to provide a uniform system of rules for governing the implementation of floating point arithmetic systems. This standard is identified as ANSI/IEEE Standard No. 754-1985, and is incorporated by reference herein. In the design of floating point arithmetic systems and algorithms, it is a principal objective to achieve results which are consistent with this standard, to enable users of such systems and algorithms to achieve conformity in the calculations and solutions to problems even though the problems are solved using different computer systems. The standard specifies basic and extended floating point number formats, arithmetic operations, conversions between integer and floating point formats, conversions between different floating point formats, conversions between basic format floating point numbers and decimal strings, and the handling of certain floating point exceptions.

The typical floating point arithmetic operation may be accomplished in either single precision or double precision format. Each of these formats utilizes a sign, exponent and fraction field, where the respective fields occupy predefined portions of the floating point number. In the case of a 32-bit single precision number the sign field is a single bit occupying the most significant bit position; the exponent field is an 8-bit quantity occupying the next-most significant bit positions; the fraction field occupies the least significant 23-bit positions. In the case of a double precision floating point number the sign field is a single bit occupying the most significant bit position; the exponent field is an 11-bit field occupying the next-most significant bit positions; the fraction field is a 52-bit field occupying the least significant bit positions.

After each floating point answer is developed, it must be normalized and then rounded. When the answer is normalized, the number of leading zeros in the fraction field is counted. This number is then subtracted from the exponent and the fraction is shifted left until a "1" resides in the most significant bit position of the fraction field. Certain floating point answers cannot be normalized because the exponent is already at its lowest possible value and the most significant bit of the fraction field is not a "1."

In designing the hardware and logic for performing floating point arithmetic operations in conformance with ANSI/IEEE Standard 754-1985, it is necessary and desirable to incorporate certain additional indicator bits into the floating point hardware operations. These indicator bits are injected into the fraction field of the floating point number, and are used by the arithmetic control logic to indicate when certain conditions exist in the floating point operation. For example, an "implicit" bit I is created by the arithmetic control logic when the exponent of the floating point number has a nonzero value. The implicit bit I is created at the time a floating point number is loaded into the arithmetic registers, and the implicit bit I occupies the first bit position in the fraction field of the number. In addition, a "guard" bit G is set by the floating point control logic during certain arithmetic operations, as an indicator of the loss of precision of the floating point number being processed. The G bit is set when a right shift, required for normalization, shifts a significant bit off the right side of the register capacity. For single precision numbers the G bit occupies bit position 25 in the fraction field; for double precision numbers the G bit occupies position 54 in the fraction field. A "round" bit is similarly used for certain floating point arithmetic operations, and is set by the arithmetic control logic, and the R bit occupies bit position 26 in the fraction field of a single precision number, and bit position 55 in the fraction field of a double precision number. Finally, a "sticky" bit S is an indicator bit which is set in certain floating point arithmetic operations when any lower precision bit is a "1," as an indicator that the floating point number has lost some precision. The S bit occupies position 27 of the fraction field in a single precision floating point number, and position 56 in the fraction field of a double precision floating point number.

The three extra bits in the fraction field are used exclusively for rounding operations, after the result has been normalized. The guard (G) and round (R) bits are treated as if they are a part of the fraction; they are shifted with the rest of the fraction, and included in all arithmetic. The sticky (S) bit is not shifted with the fraction, but is included in the arithmetic. It acts as a "catcher" for 1's shifted off the right of the fraction; when a 1 is shifted off the right side of the fraction, the S bit will remain a 1 until normalization and rounding are finished.

In a rounding operation there are typically four modes of rounding which are used, as follows:
 (1) round to nearest;
 (2) round to positive infinity;
 (3) round to negative infinity;

(4) round to zero.

The "round to nearest" mode means that the value nearest to the infinitely precise result should be delivered. If the two nearest representable values are equally near, the one with its least significant bit zero shall be delivered. The "round to positive infinity" mode means that the value closest to and not less than the infinitely precise result should be delivered. The "round to negative infinity" mode means that the value closest to and not greater than the infinitely precise result should be delivered. The "round to zero" mode means that the result delivered should be the closest to but not greater in magnitude than the infinitely precise result. If none of the G, R, and S bits are a "1," no rounding will be accomplished regardless of the mode of rounding selected.

It is a principal object of the present invention to provide an apparatus and method for floating point arithmetic operations, wholly in conformance with ANSI/IEEE Standard No. 754-1985.

It is a further object of the present invention to provide an apparatus and method for achieving certain floating point arithmetic operations in a shorter time period than previously obtained, through the selective reduction in the number of machine cycles required to provide these operations.

It is a further object of the present invention to provide an apparatus and method for processing postnormalization and rounding operations in parallel, to achieve a desirable reduction in the processing time.

SUMMARY OF THE INVENTION

The invention includes an apparatus for performing floating point arithmetic operations, and a method for processing the apparatus to implement parallel normalization and rounding operations. The fractional result of a floating point arithmetic operation is examined at the first 2-bit positions; if these 2-bit positions are in the form 1.X no normalization will be required and only a rounding operation will be executed. If the first 2-bit positions are in the form 0.1X the fraction will be shifted left one position and then the rounding operation will be implemented, without further normalization. If the first 2-bits are in neither of the predescribed formats the fraction will be normalized and sent directly to an output without the necessity of incurring a rounding operation. Since the need to perform normalization and/or rounding is completely predictable and dependent upon the foregoing 2-bit formats, the operation of normalization and rounding can be accomplished as a parallel processing operation rather than as a sequential processing operation.

DESCRIPTION OF THE PREFERRED EMBODIMENT

Figure 1:
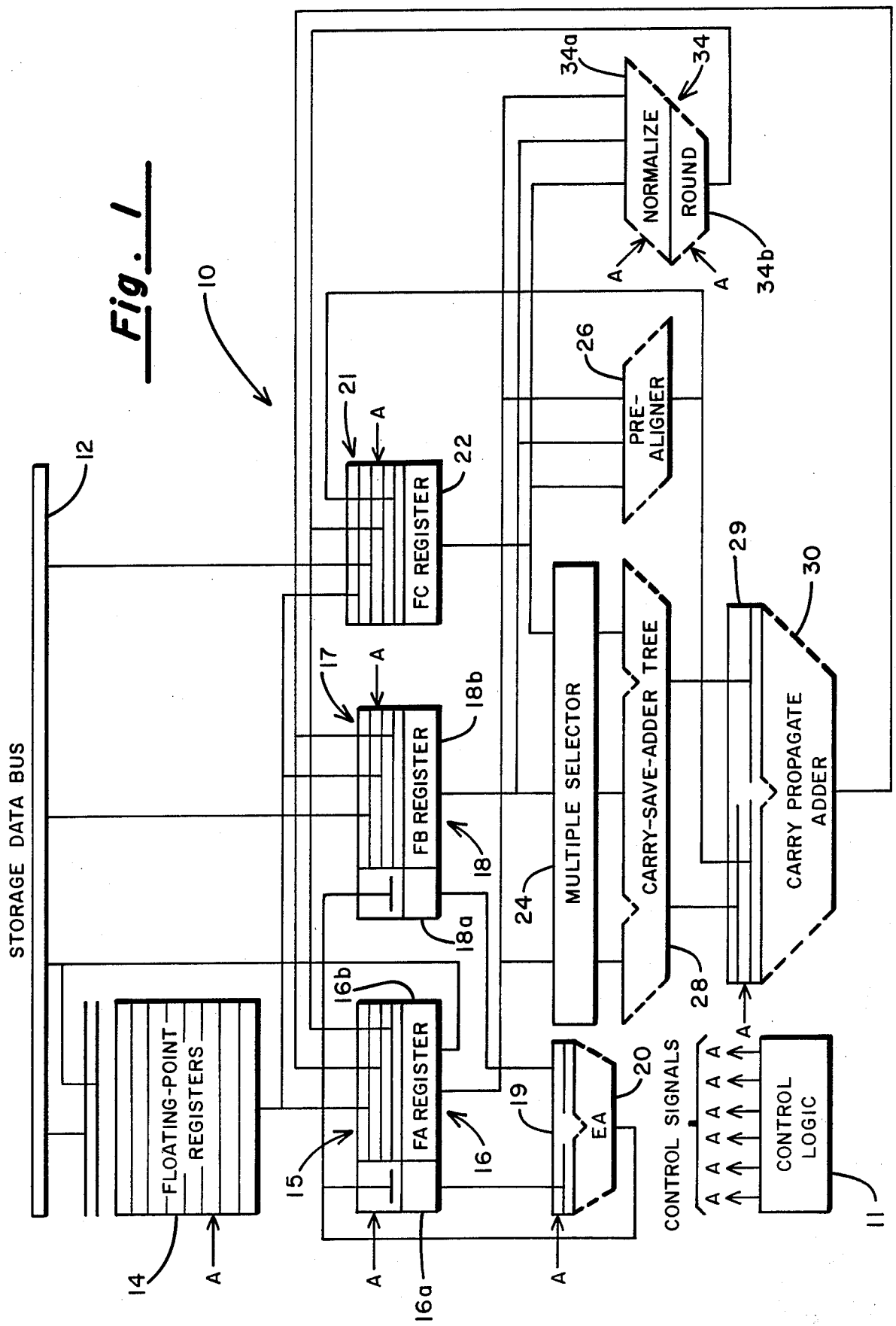
FIG. 1 shows a block diagram of a floating point arithmetic circuit used with the present invention.

Referring first to FIG. 1, there is shown a block diagram of the floating point arithmetic circuit 10 which is used in conjunction with the present invention. The execution of floating point arithmetic utilizes this circuit because of the specific algorithms which must be performed to determine the proper results. This circuit presumes that the floating point numbers have been prearranged according to a particular format, where the most significant bit represents the sign of the floating point number, and wherein a group of the next-most significant bits represent the exponent of the floating point number, and wherein the remaining bits represent the fraction value of the number; i.e., the fraction value presuming that the binary point is placed at the leftmost end of the fraction value. In the case of floating point arithmetic utilizing single precision calculations wherein the size of the number is 32-bits, the sign bit is presumed to be bit 0, the exponent bits are 1-8, and the fraction value bits are 9-31. In the case where the floating point arithmetic is accomplished utilizing double precision numbers, the sign bit is bit 0, the exponent bits are 1-11, and the fractional value bits are 12-63. In addition to the foregoing identified bits, the hardware registers and logic associated with FIG. 1 include four additional bits; the I bit occupies the most significant position in the fraction field, and the G, R and S bits respectively occupy the least significant bit positions in the fraction field.

Floating point operands cannot be added to or subtracted from each other unless their exponents are equal. This requires that their exponents be compared, and the operand fraction with the smaller exponent be shifted the amount of the exponent difference. The fractions can then be added or subtracted with the larger exponent as the result exponent. Multiplication of floating point operands requires that the exponents be added and the fractions multiplied. Division of floating point operands requires that the divisor exponent be subtracted from the dividend exponent and the dividend fraction be divided by the divisor fraction.

The floating point arithmetic circuit of FIG. 1 can support both single and double precision arithmetic operations. It is designed to support a floating point add or subtract operation, a 14-bit floating point multiply operation, and a 2-bit floating point divide operation.

The floating point arithmetic circuit 10 of FIG. 1 utilizes a storage data buss 12 for receiving and transmitting data from other sources, such as a data processing system or the like. Information received over data storage buss 12 may be transmitted into a plurality of floating point registers 14. In the preferred embodiment there are eight floating point registers 14, each adapted to hold the floating point operands and the results of floating point operations. Floating point registers 14 may transmit information to an FA register 16, an FB register 18, or an FC register 22. FA register 16 may also transmit information back to floating point registers 14.

The FA register 16 is a destination register for data from the floating point registers 14, and is the source register for data being transmitted to the floating point registers 14. The FA register 16 is also the source register for data which may be transferred to a memory via storage data buss 12, and it is a destination register for data transmitted from the carry-propagate adder 30, the exponent adder 20, and from the normalize-round circuit 34. The FA register 16 has outputs to the multiple selector 24, the prealigner circuit 26, the normalize-round circuit 34, and the exponent adder 20. The FA register 16 contains the second operand for add, subtract, compare, multiply and divide operations. FA register 16 has a section 16a for holding the exponent of the floating point number, and a section 16b for holding the operand portion of the floating point number.

In order to selectively control which of the plurality of inputs to the FA register 16 are to be gated into the register, the FA register 16 has an input multiplexer circuit 15 associated therewith. Multiplexer circuit 15 provides for the selective gating of the various inputs into register 16, under control of an activation signal A. Other registers in the floating point arithmetic circuit 10 have similar multiplexer input controls A control logic circuit 11 generates all of the activation signals required for data interchange and processing operations within floating point arithmetic circuit 10. Control logic circuit 11 has a plurality of control signal outputs, designated A, each of which serve as control inputs to various circuits and registers. It is well within the skill of the art to understand the need and design for a control logic circuit 11, as well as the activation signals A which are required for the operation of floating point arithmetic circuit 10; accordingly, a detailed presentation of these circuits and signals is not required herein.

The FB register 18 is a destination register for data received from the storage data buss 12, the floating point registers 14, and is also a destination register for data from the carry-propagate adder 30, and from the normalize-round circuit 34. It has outputs to the multiple selector 24, the prealigner circuit 26, and the exponent adder 20. The FB register is used to contain the first operand for the add, subtract, compare and divide operations; it also contains the intermediate result of the add, subtract and multiply operations. The FB register 18 has a section 18a for containing the exponent value of the floating point number, and a section 18b for containing the operand portion of the floating point number, and has an input multiplexer circuit 17 for gating data into the register under control of activation signals from control logic circuit 11.

The FC register 22 is a destination register for data from memory via storage data buss 12, and a destination register for data from the carry-propagate adder 30 and from the normalize-round circuit 34. It is also the destination register from the floating point registers 14. The FC register 22 has outputs to the multiple selector 24, the prealigner circuit 26, and the normalize-round circuit 34. The FC register 22 is used to contain the first operand of the multiply operation, and it is the destination register for the result of a divide operation. An input multiplexer circuit 21 controls the gating of data into FC register 22, under control of activation signals from control logic circuit 11.

The exponent adder 20 is a 13-bit adder circuit that is used for exponent arithmetic. It handles the exponent calculations for either single or double precision exponents. The exponent adder is a source for data transmitted to FA register section 16a, and FB register section 18a. The exponent adder 20 has an input multiplexer circuit 19.

The prealigner circuit 26 is used to pre-shift the fraction with the smaller exponent for the add and subtract operation, which is necessary to make the floating point operand exponents equal prior to an add or subtract operation. The prealigner circuit 26 has the capability to shift a floating point fraction right from 0 to 55-bit positions, depending upon whether single or double precision arithmetic is being performed. The prealigner circuit 26 has an output to the carry-propagate adder 30, and to the FC register 22.

The multiple selector 24 is a logic circuit which generates multiples of the multiplicand for the multiply operation, and multiples of the divisor for the divide operation. For the divide operation, the multiples are decoded from the high-order bits of the dividend, or partial dividend, and of the divisor. The complement of the operand may be generated by the multiple selector when necessary. The multiple selector 24 receives data from the FA register 16, the FB register 18, and the FC register 22. The multiple selector 24 has outputs to the carry-save adder tree 28.

The carry-save adder tree 28 will permit three operands to be added together at the same time. This permits the use of a divide algorithm which generates two quotient bits per iteration. The carry-save adder tree 28 receives data from the multiple selector 24, and transmits data to the carry-propagate adder 30.

The carry-propagate adder 30 is a 57-bit adder, and has an input from the carry-save adder 28 for generating the partial product of a multiply operation or the partial dividend of a divide operation. The carry-propagate adder circuit 30 may also receive inputs from the prealigner circuit 26, the FA register 16, and the FB register 18. The carry-propagate adder has an output connection to the FA register 16 and the FB register 18. An input multiplexer circuit 29 controls the gating of data into carry-propagate adder 30, under control of activation signals A from control logic circuit 11.

The normalize-round circuit 34 includes a normalize circuit 34a which is used to normalize the results of a floating point operation. For example, the result of a multiply operation may require a left-shift of 1-bit in order to normalize the fraction, and the result of an add or subtract operation may require a left-shift of up to 54-bit positions. The normalize-round circuit 34 also includes a round circuit 34b, which contains an incrementor circuit, for use in certain rounding operations, where the result may have to be incremented by a value of 1 in the low-order bit position.

Figure 2:
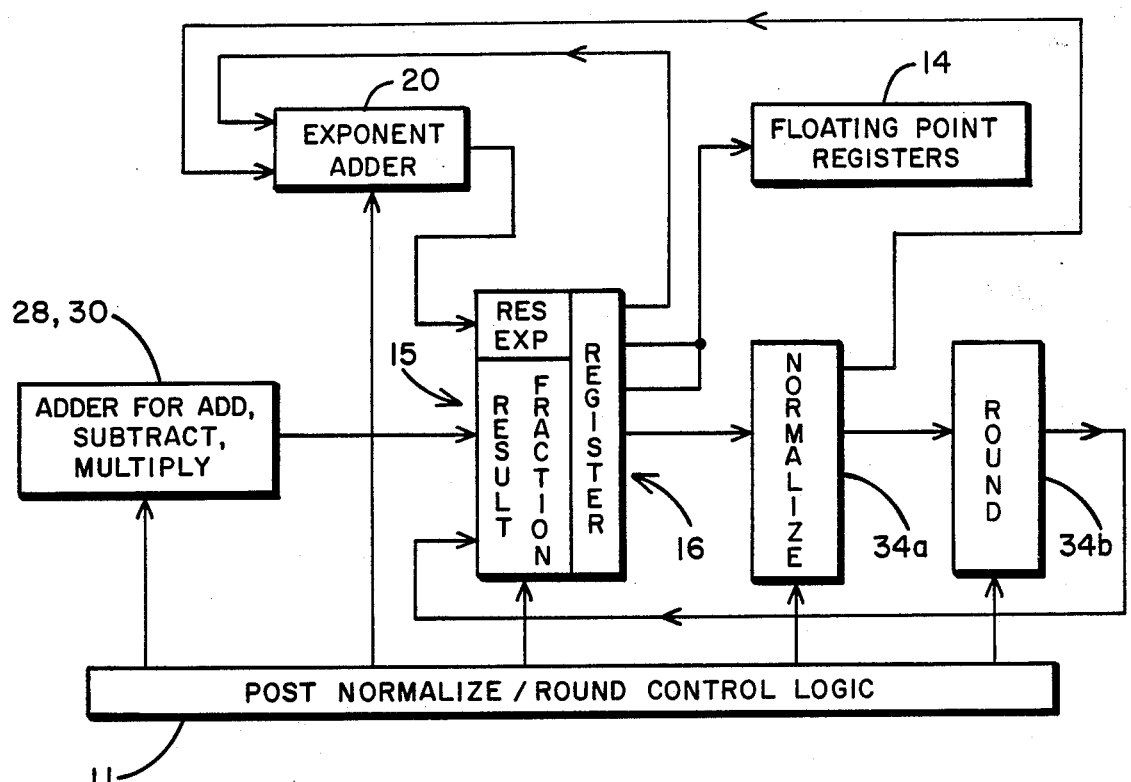
FIG. 2 shows a portion of the circuit of FIG. 1 used for normalize and round operations according to the prior art.
Figure 3:
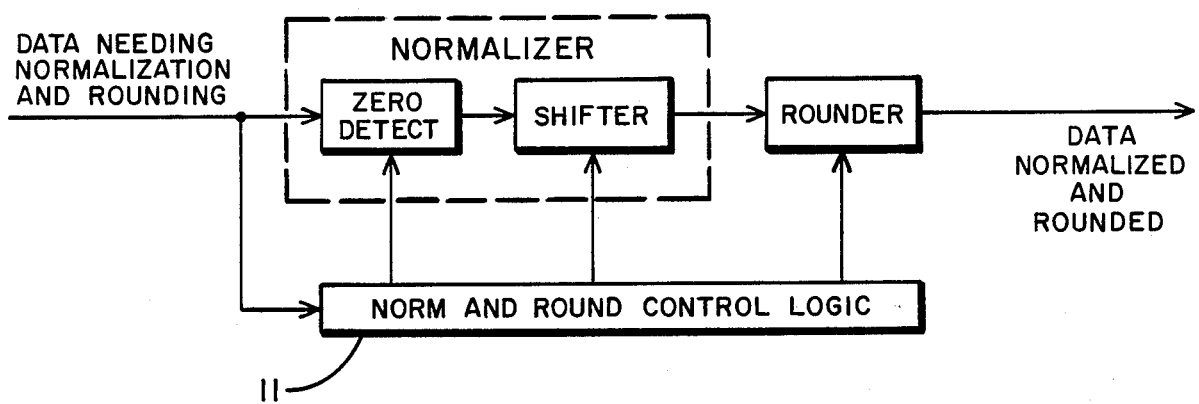
FIG. 3 shows the data flow path for prior art rounding and normalizing.

FIG. 2 shows the parts of the circuit of FIG. 1 which are utilized for normalization and rounding after an arithmetic operation has been completed according to the teachings of the prior art. FIG. 3 shows a data flow path for prior art normalizing and rounding, wherein the floating point result needing normalization and rounding is first processed for normalization, and subsequently processed for rounding. The steps of the data flow path are under control of a normalize and rounding control logic circuit 11, and the operations are sequentially performed. Referring to the block diagram of FIG. 2, the sequence of normalizing and rounding requires several steps of operation. First, the result fraction held in register 16 is normalized by gating it into a normalize logic circuit 34a, which is essentially a shifter. The data in normalize circuit 34a is left shifted to eliminate all of the leading zeros, and a count is made of the number of shifts required to accomplish this. The shift count is subtracted from the result exponent of register 16, in exponent adder 20, and the resulting exponent is replaced into register 16a. Next, the normalized fraction is rounded by round circuit 34b, which operates according to predetermined rounding parameters, and the rounded fraction is replaced into register 16b. Finally, the new exponent and fraction quantity is transferred into one of the floating point registers 14 for subsequent operations.

Because the normalizing and rounding operations, when required, are typically accomplished in sequential fashion, they frequently take an inordinate amount of time for completion. The present invention provides a solution to this time problem, by converting the sequential normalizing and rounding operations into parallel operations.

The result fraction for all arithmetic operations can be represented in one of the four following formats:
(1) 1.XXX . . . XX
(2) 0.1XXX . . . XX
(3) 0.0XXX . . . XX
(4) 1X.XXX . . . XX In the first case above, no normalization is needed since the implicit bit (I) is already a 1; rounding is the only operation required. In the second case above, normalization is needed for only a one-bit shift to the left; for this case a "quick shift" of one-bit position to the left can be made and rounding will necessarily follow. For the third case above, which is only possible for a subtract operation, the "sticky bit" (S) will be a zero, and the guard bit (G) and the round bit (R) will be shifted out during normalization and replaced by zeros. Since all three rounding bits, the guard (G), round (R) and sticky (S) bits will be zero after normalization, no rounding will be required regardless of the rounding mode; therefore, only normalization is necessary. The fourth case is discussed below.

For example, any multiplication operation utilizing pre-normalized operands will result in a product in either the form of case 1 or case 2 above. Similarly, any division operation which is performed using a 2-bit non-restore divide algorithm, which uses pre-normalized operands, will produce a quotient always in the form of case 1 or case 2 above. Addition and subtraction operations will provide results in any of the four possible formats. The present invention deals with the formats represented by cases 1, 2 and 3 above, and copending U.S. patent application Ser. No. 07/339,347, entitled "Floating Point Normalization and Rounding Prediction Circuit," filed of even date herewith, discloses an invention that effectively converts case 4 into a case 1 format.

Table 1 shows a chart which illustrates examples for addition solutions and Table 2 illustrates examples for subtraction solutions. Referring to these tables, operand 1 and 2 are the fractional values to be added or subtracted, and the "exponent difference" indicates if the operand exponents are equal (difference of zero) or not equal (difference greater than zero), or have a difference of one. The "result" column identifies the possible formats of the answer. The column entitled "Norm" indicates whether normalization is needed (Y), and the column entitled "Round" indicates whether rounding is needed, and if so, how the rounding will be performed.

TABLE 1

| Operation | Operand 1 | Operand 2 | Exponent Difference | Result | Norm | Round |
|---|---|---|---|---|---|---|
| Addition | 1.XX | 1.XX | 0 | 1x.xx | | R1 |
| | | | >0 | 1x.xx | | R1 |

TABLE 1-continued

| Operation | Operand 1 | Operand 2 | Exponent Difference | Result | Norm | Round |
|---|---|---|---|---|---|---|
| | | | >0 | 1.xx | | R2 |
| | 1.XX | 0.XX | 0 | 1x.xx | | R1 |
| | | | 0 | 1.xx | | R2 |
| | | | >0 | 1.xx | | R2 |
| | | | >0 | 1x.xx | | R1 |
| | 0.XX | 0.XX | 0 | 1.xx | Y | |
| | | | 0 | 0.1x | Y | |
| | | | 0 | 0.0x | Y | |
| | | | >0 | Not Possible | | |

TABLE 2

| Operation | Operand 1 | Operand 2 | Exponent Difference | Result | Norm | Round |
|---|---|---|---|---|---|---|
| Sub- | 1.xx | 1.xx | 0 | 0.1x | | R3 |
| | | | 0 | 0.0x | Y | |
| | | | >0 | 1.xx | | R2 |
| | | | >0 | 0.1x | | R3 |
| | | | 1 | 0.0x | Y | |
| | 1.xx | 0.xx | 0 | 1.xx | | R2 |
| | | | 0 | 0.1x | Y | |
| | | | 0 | 0.0x | Y | |
| | | | >0 | 1.xx | | R2 |
| | | | >0 | 0.1x | | R3 |
| | 0.xx | 0.xx | 0 | 0.xx | Nothing to be done | |
| | | | >0 | Not Possible | | |

There are three types of rounding indicated in Tables 1 and 2, which may be defined as follows:

R1: indicates that the method of the copending application hereinbefore identified will be used for rounding;

R2: indicates that a round will occur without any shifting operation;

R3: indicates that a 1-bit shift to the left will occur before rounding.

According to the R1 mode for rounding, the fractional result is shifted 1-bit position to the right and rounded when needed. According to the R2 mode of rounding, no shift is required and rounding is done normally. According to the R3 mode of rounding, the fractional result is shifted 1-bit position to the left and rounding is done normally.

When subtracting two normalized numbers with the same exponent, the result will be either 0.1XXX . . . or 0.0XXX . . . . For both results, the guard (G), round (R) and sticky (S) will not be set, so normalization is the only operation which needs to be completed. If one exponent is higher, the result will be in the format 1.XXX . . . or 0.1XXX or 0.0XXX. In the first format (1.XXX . . . ) rounding is the only operation needed, and in the second format (0.1XXX . . . ) the result can be normalized and rounded through a single one-bit left shift and then rounded normally. In the third format a normalize only operation is required. This third format can only occur for a difference of 1 between the two exponents. If the difference between the exponents is greater than 1, then the result will be of the form 0.1X or 1.XX. If the difference between the exponents is 1, then only the guard bit G can be set; the guard bit G will be cleared upon normalization since the result is 0.0X; i.e., no requirement for rounding will exist with the third format. In other words, it is never necessary to both shift more than 1-bit and also to round the result.

When calculating the difference between a normalized number and denormalized number with equal exponents, the possible results are in the formats 1.XXX .

..., 0.1XXX ..., or 0.0XXX .... Rounding only is required for the case of 1.XXX.... Rounding with a 1-bit left shift will handle the 0.1XXX ... case; the 0.0XXX... case will only need normalization, since the rounding bits will not be set when this format occurs.

When calculating the difference between a normalized and denormalized number with unequal exponents, the possible results are in the format 1.XXX ... and 0.1XXX .... This case may cause the rounding bits to be set, and the result may be rounded without and with the 1-bit left shift respectively. In other words, it is apparent that the result from a subtraction between a normalized operand and denormalized operand never require more than a 1-bit shift when rounding is required.

Since all denormalized numbers have equal exponents, it is impossible for the difference between the exponents to be greater than zero for subtraction of two denormalized numbers. When subtracting two denormalized numbers the only possible answer is in the format 0.XXX .... This answer requires no rounding, since none of the rounding bits are set; and no normalization, since the answer is a denormalized number.

Figure 4:
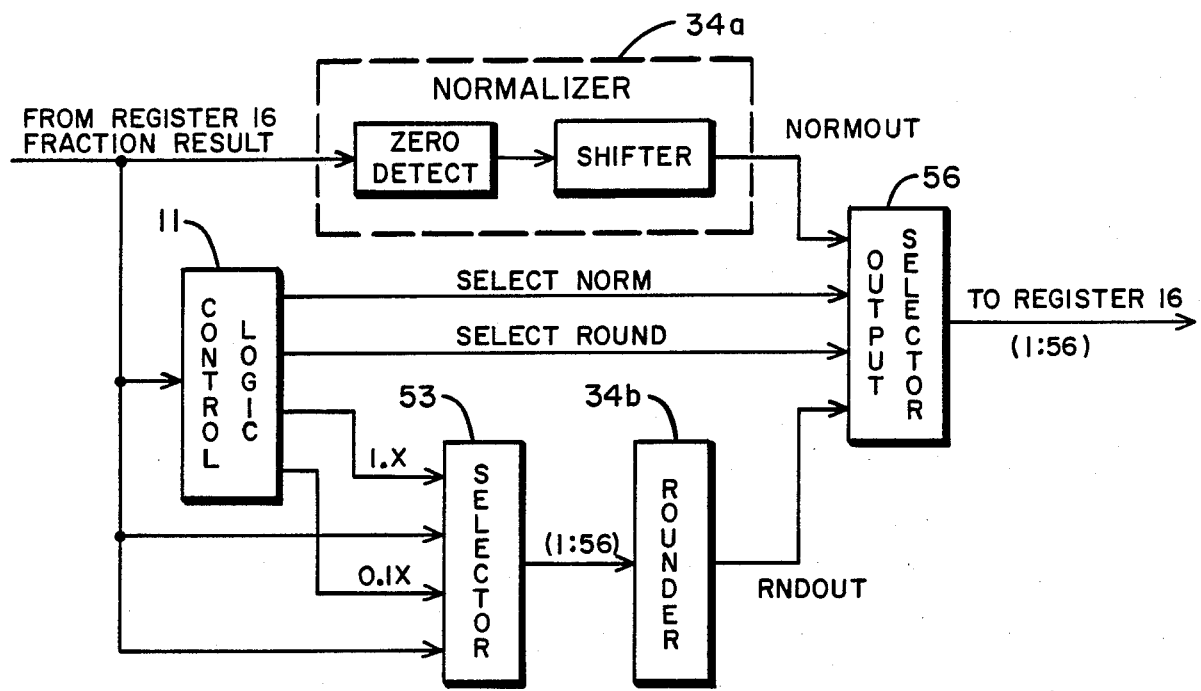
FIG. 4 shows a portion of the circuit of FIG. 1, used for normalize and round operations according to the invention.

FIG. 4 shows the arithmetic circuit 10 modification organization for normalization and rounding in parallel according to the teachings of the present invention. The fraction resulting from an arithmetic operation is held in register 16 in one of the three possible formats described above. The fraction result is simultaneously coupled to normalize circuit 34a and selector circuit 53. Normalize circuit 34a operates in the conventional manner described hereinbefore, and provides a normalized output to output selector circuit 56. The parallel connection from register 16 to selector circuit 53 is further controlled by control logic circuit 11. Control logic circuit 11 examines the first two bits of the fractional result, and activates the selector line (1.X) if the 2-bit format is 1.X, and activates the selector line (0.1X) if the 2-bit format is 0.1X. If the 2-bit format is neither 1.X nor 0.1X the fractional result from register 16 is not passed through selector circuit 53 to round circuit 34b, but is sent to normalizer 34a. If the fractional result 2-bit format is 1.X, the fractional result is passed directly through selector circuit 53 into rounder circuit 34b, and thence to output selector circuit 56; the signal "select round" is simultaneously activated, causing output selector circuit 56 to gate the signals received from rounder circuit 34 back to register 16. This sequence is followed because, when the 2-bit format is 1.X, the implicit bit I is set to a "1," and no normalization is required—the only operation being required is rounding.

If the 2-bit format of the fractional result is 0.1, and the exponent difference is not zero, the control logic circuit 11 activates signal line (0.1X) thereby shifting the fractional result one bit position to the left while at the same time transferring the result through selector circuit 53 into rounder 34b, and thence into output selector 56.

Control logic circuit 11 will activate either the signal "select norm" or the signal "select round" depending upon the 2-bit format examination, and also depending upon the value of the exponent difference. The various combinations which are possible, and which determine the signal line to be activated, are shown in Tables 1 and 2. It is apparent from an examination of Tables 1 and 2 that activation of either the "select norm" signal or the "select round" signal, but not both, will accomplish the desired result in all cases. It is therefore apparent that, according to the teachings of the invention, the postnormalization and rounding operations may be performed in parallel as described, obviating the need for sequential processing as was accomplished in the prior art. This parallel processing reduces the total time required for such post-processing, and consequently results in a net savings in processing time in accordance with the present invention.

Figure 5:
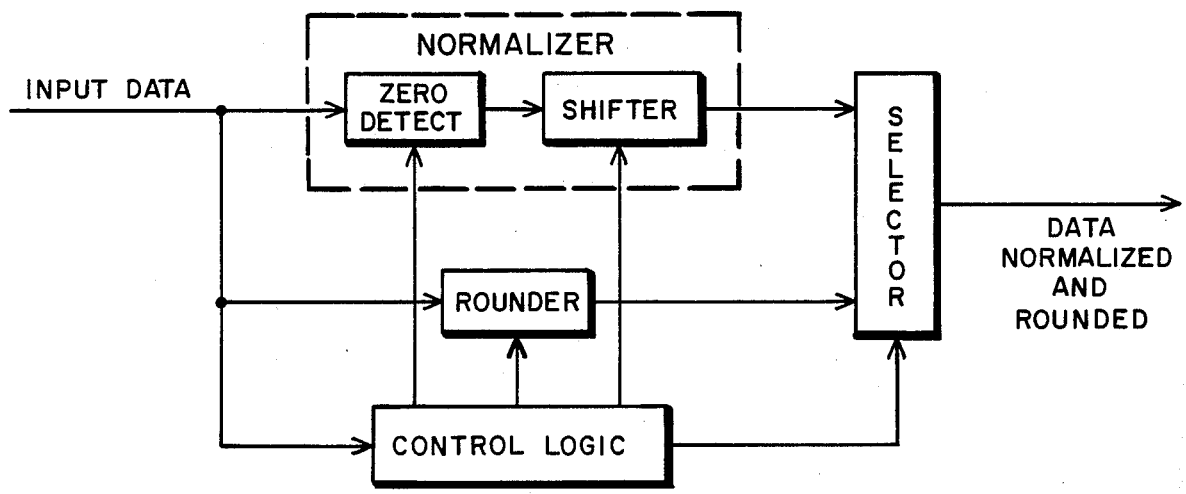
FIG. 5 shows the data flow path required for the invention.

FIG. 5 shows the data flow path for practice of the invention, wherein the fraction result is simultaneously coupled to both the normalizer and the rounder, and the parallel processing is controlled by the control logic 11. Control logic 11 signals to the output selector 56 to indicate which of the two parallel paths contain the correct output result.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for post-processing the exponent and fractional result of a floating point arithmetic operation for parallel operation of a rounding circuit and a normalization circuit, comprising
    (a) a normalizer circuit having means for normalizing the fractional result and a rounding circuit having means for rounding the fractional result;
    (b) a selector circuit connected to said rounding circuit, said selector circuit having a first selectable means for transferring said fractional result to said rounding circuit, and having a second selectable means for shifting said fractional result leftward by one bit position and transferring the shifted fractional result to said rounding circuit;
    (c) means for parallel-transferring said fractional result to said selector circuit and to said normalizer circuit;
    (d) an output circuit coupled to receive the output of the normalizer circuit and the output of the rounding circuit, said output circuit having a control signal input means for selecting either the normalizer circuit output or the rounding circuit output; and
    (e) a control logic circuit having means for sensing the leftmost bits of the fractional result for the format 1. X or 0.1X, wherein "X" indicates any value, and having means for activating said selector circuit first selectable means if the format is 1.X and means for activating said selector circuit second selectable means if the forward is 0.1X, and having means for activating said output circuit control signal input means, for selecting one of either the normalizer circuit output or the rounding circuit output.

2. The apparatus of claim 1, wherein said control logic circuit further comprises means for detecting whether an addition, subtraction, multiply or divide floating point arithmetic operation produces the exponent and fractional result.

3. The apparatus of claim 1, wherein said control logic circuit means for activating said output circuit control signal input means, further comprises means for sensing the leftmost bits of the fractional result for the format 0.0X, and activating the output control signal input to select the normalizer circuit output when the format 0.0X is sensed.

4. The apparatus of claim 3, wherein said output circuit further comprises means for transferring its selected input to a floating point result register.

5. A method for post-processing the exponent and fractional result of a floating point arithmetic operation for either, but not both, rounding or normalizing said exponent and fractional result, by selectively controlling the transfer of the fractional result into both a normalizing circuit and a rounding circuit, and selectively thereafter transferring either the normalizing circuit output or the rounding circuit output into a result register, comprising the following steps, wherein "X" indicates any value:

(a) sensing the first bits of said fractional result to determine whether they are the format 1.X or 0.1X or 0.0X;

(b) if the sensed format is 1.X, transferring the fractional result directly into said rounding circuit and transferring said rounding circuit output to said result register;

(c) if the sensed format is 0.1X, shifting the fractional result leftward one bit position and transferring the left-shifted fractional result into said rounding circuit and transferring said rounding circuit output to said result register; and (d) if the sensed format is 0.0X, transferring the fractional result directly into said normalizing circuit and transferring said normalizing circuit output into said result register.

* * * * *